United States Patent
Ramberg et al.

(10) Patent No.: US 11,962,118 B2
(45) Date of Patent: Apr. 16, 2024

(54) ULTRAVIOLET FILTER FOR RING LASER GYROSCOPE MIRRORS

(71) Applicant: Honeywell International Inc., Charlotte, NC (US)

(72) Inventors: Randy Ramberg, Roseville, MN (US); Lance Vrieze, Oakdale, MN (US); Steven C. Albers, Coon Rapids, MN (US); Dean Eivind Johnson, Orono, MN (US)

(73) Assignee: Honeywell International Inc., Charlotte, NC (US)

( * ) Notice: Subject to any disclaimer, the term of this patent is extended or adjusted under 35 U.S.C. 154(b) by 713 days.

(21) Appl. No.: 17/081,764

(22) Filed: Oct. 27, 2020

(65) Prior Publication Data
US 2022/0131333 A1    Apr. 28, 2022

(51) Int. Cl.
*H01S 3/08*    (2023.01)
*G01C 19/66*    (2006.01)
(Continued)

(52) U.S. Cl.
CPC ........ *H01S 3/08059* (2013.01); *G01C 19/661* (2013.01); *G02B 1/02* (2013.01);
(Continued)

(58) Field of Classification Search
CPC ... H01S 3/08059; H01S 3/083; G01C 19/661; G02B 1/02; G02B 5/0816; G02B 5/283
See application file for complete search history.

(56) References Cited

U.S. PATENT DOCUMENTS

| | | | |
|---|---|---|---|
| 4,609,267 A | 9/1986 | Deguchi et al. | |
| 4,900,137 A | 2/1990 | Carter | |

(Continued)

FOREIGN PATENT DOCUMENTS

| | | |
|---|---|---|
| CN | 105406336 A | 5/2020 |
| EP | 0372438 A2 | 6/1990 |

(Continued)

OTHER PUBLICATIONS

European Patent Office, "Extended European Search Report from EP Application No. 21205001.7", from Foreign Counterpart to U.S. Appl. No. 17/081,764, dated Apr. 29, 2022, pp. 1 through 9, Published: EP.

(Continued)

*Primary Examiner* — Dominic J Bologna
*Assistant Examiner* — Huy Phillip Pham
(74) *Attorney, Agent, or Firm* — Fogg & Powers LLC

(57) ABSTRACT

A multilayer mirror comprises a reflector section including a plurality of alternating layers of a high index material and a low index material, and a filter section over the reflector section. The filter section comprises a first filter layer including a low index material on a layer of high index material of the reflector section; a second filter layer on the first filter layer, the second filter layer comprising a high index material that is different than the high index material in the reflector section; and a third filter layer on the second filter layer, the third filter layer comprising a low index material. Each filter layer has an optical thickness greater than or equal to the optical thickness of each layer of the alternating layers. The filter section substantially blocks (Continued)

ultraviolet (UV) energy, thereby preventing UV energy from substantially impinging on the high index material of the reflector section.

16 Claims, 5 Drawing Sheets

(51) Int. Cl.
  *G02B 1/02*     (2006.01)
  *G02B 5/08*     (2006.01)
  *G02B 5/28*     (2006.01)
  *H01S 3/083*    (2006.01)

(52) U.S. Cl.
  CPC ........... *G02B 5/0816* (2013.01); *G02B 5/283* (2013.01); *H01S 3/083* (2013.01)

(56) References Cited

U.S. PATENT DOCUMENTS

| | | | |
|---|---|---|---|
| 4,968,136 | A | 11/1990 | Lim et al. |
| 5,513,039 | A | 4/1996 | Lu et al. |
| 5,574,738 | A | 11/1996 | Morgan |
| 5,646,780 | A | 7/1997 | Crook et al. |
| 5,843,235 | A | 12/1998 | Bergman et al. |
| 6,685,341 | B2 | 2/2004 | Ouderkirk et al. |
| 7,474,733 | B1 | 1/2009 | Yamamoto |
| 7,760,432 | B2 | 7/2010 | Ramberg et al. |
| 2008/0137706 | A1 | 6/2008 | Anderson et al. |
| 2011/0274133 | A1 | 11/2011 | Schober et al. |
| 2016/0070041 | A1 | 3/2016 | Apitz |
| 2016/0202396 | A1* | 7/2016 | Goehnermeier ..... G02B 5/0816 359/359 |
| 2018/0321428 | A1* | 11/2018 | Jones .................. G01J 3/02 |
| 2019/0324175 | A1 | 10/2019 | Albers et al. |
| 2020/0056889 | A1* | 2/2020 | Touchberry ........... H01S 3/0621 |
| 2020/0059062 | A1 | 2/2020 | Marta et al. |

FOREIGN PATENT DOCUMENTS

| | | | |
|---|---|---|---|
| EP | 0626597 A1 * | 11/1994 | |
| EP | 1933176 A1 | 6/2008 | |
| RU | 2713566 C1 * | 2/2020 | |

OTHER PUBLICATIONS

State Intellectual Property Office, P.R. China, "Office Action", from CN Application No. 2201910314761.7, dated Sep. 20, 2023, from Foreign Counterpart to U.S. Appl. No. 15/956,672, pp. 1 through 7, Published: CN.

Chao et al., "Low-loss dielectric mirror with ion-beam-sputtered TiO2-SiO2 mixed films", Applied Optics, May 1, 2001, pp. 2177 through 2182, vol. 40, No. 13, Optical Society of America.

Cho et al., "Design and Development of an Ultralow Optical Loss Mirror Coating for Zerodur Substrate", Journal of the Optical Society of Korea, Mar. 2012, pp. 80-84, vol. 16, No. 1, http://dx.doi.org/10.3807/JOSK.2012.16.1.080.

European Patent Office, "Communication pursuant Article 94(3) EPC from EP Application No. 19170352.9", from Foreign Counterpart to U.S. Appl. No. 15/956,672, dated Mar. 11, 2020, pp. 1 through 4, Published: EP.

European Patent Office, "Extended European Search Report from EP Application No. 19170352.9", from Foreign Counterpart to U.S. Appl. No. 15/956,672, dated Sep. 19, 2019, pp. 1 through 9, Published: EP.

U.S. Patent and Trademark Office, "Office Action", U.S. Appl. No. 15/956,672, dated Jan. 3, 2020, pp. 1 through 15, Published: US.

U.S. Patent and Trademark Office, "Advisory Action", U.S. Appl. No. 15/956,672, dated Jun. 18, 2020, pp. 1 through 4, Published: US.

U.S. Patent and Trademark Office, "Final Office Action", U.S. Appl. No. 15/956,672, dated Apr. 13, 2020, pp. 1 through 15, Published: US.

Vinnins et al., "Performance Evaluation of the Honeywell GG1308 Miniature Ring Laser Gyroscope", Defence Research Establishment Ottawa Report No. 1166, Jan. 1993, pp. 1 through 49, National Defence.

European Patent Office, "Communication under Rule 71(3) EPC from EP Application No. 19170352.9", from Foreign Counterpart to U.S. Appl. No. 15/956,672, dated Oct. 7, 2020, pp. 1 through 21, Published: EP.

European Patent Office, "Communication", from EP Application No. 21205001.7, from Foreign Counterpart to U.S. Appl. No. 17/081,764, Jan. 24, 2024, pp. 1 through 5, Published: EP.

\* cited by examiner

ULTRAVIOLET FILTER FOR RING LASER GYROSCOPE MIRRORS

BACKGROUND

A laser mirror within the plasma of a ring laser gyroscope is exposed to many high energy components that can affect the absorption of the mirror materials. In the case of many high index oxides, an ultraviolet (UV) component in the plasma can activate loss centers that absorb the laser light, reducing the power within the ring laser gyroscope.

SUMMARY

A multilayer mirror comprises a reflector section that includes a plurality of alternating layers of a high refractive index optical material and a low refractive index optical material, wherein each layer of the plurality of alternating layers has an optical thickness, and a filter section over the reflector section. The filter section comprises a first filter layer including a low refractive index optical material on a layer of high refractive index optical material of the reflector section; a second filter layer on the first filter layer, the second filter layer comprising a high refractive index optical material that is different than the high refractive index optical material in the reflector section; and a third filter layer on the second filter layer, the third filter layer comprising a low refractive index optical material. Each of the first filter layer, the second filter layer, and the third filter layer has an optical thickness that is greater than or equal to the optical thickness of each layer of the plurality of alternating layers. The filter section substantially blocks ultraviolet (UV) energy, thereby preventing UV energy from substantially impinging on the high refractive index optical material of the reflector section.

BRIEF DESCRIPTION OF THE DRAWINGS

Features of the present disclosure will be apparent to those skilled in the art from the following description with reference to the drawings. Understanding that the drawings depict only typical embodiments and are not therefore to be considered limiting in scope, the embodiments will be described with additional specificity and detail through the use of the drawings, in which.

DETAILED DESCRIPTION

In the following detailed description, reference is made to the accompanying drawings, in which is shown by way of illustration various exemplary embodiments. It is to be understood that other embodiments may be utilized. The following detailed description is, therefore, not to be taken in a limiting sense.

Multilayer mirrors with an ultraviolet (UV) filter component, which can be implemented in ring laser gyroscopes, are described herein.

The UV filter component includes a filter section having one or more filter layers of an appropriate material and thickness, formed on a multilayer mirror stack, to shield underlying materials within the mirror stack from UV radiation. In one embodiment, the filter layers are formed on top of the mirror stack. In another embodiment, the filter layers are formed just above a high index material of the mirror stack.

The filter layers are tailored to allow for a certain penetration depth of the UV radiation, and to provide material shielding qualities, such as band gap information, to prevent or minimize the amount of the UV of interest from impacting a high refractive index material in the mirror stack. To minimize interaction of the different materials within the mirror stack, the thickness of the UV filter layers can be tailored such that the nodes of the electric field are placed at the interfaces of the filter layers. The primary criteria is that the UV filter layers be thick enough to minimize harmful UV radiation, and that the filter layers do not develop loss centers that effect the laser light in a ring laser gyroscope.

The UV filter component reduces or eliminates loss increase in the multilayer mirrors, which increases the stability and life of ring laser gyroscopes over many operating hours. The UV filter component also reduce failures during manufacturing of mirrors for ring laser gyroscopes, and reduces failures of such mirrors in the field.

Further details of various embodiments are described hereafter with reference to the drawings.

Figure 1:
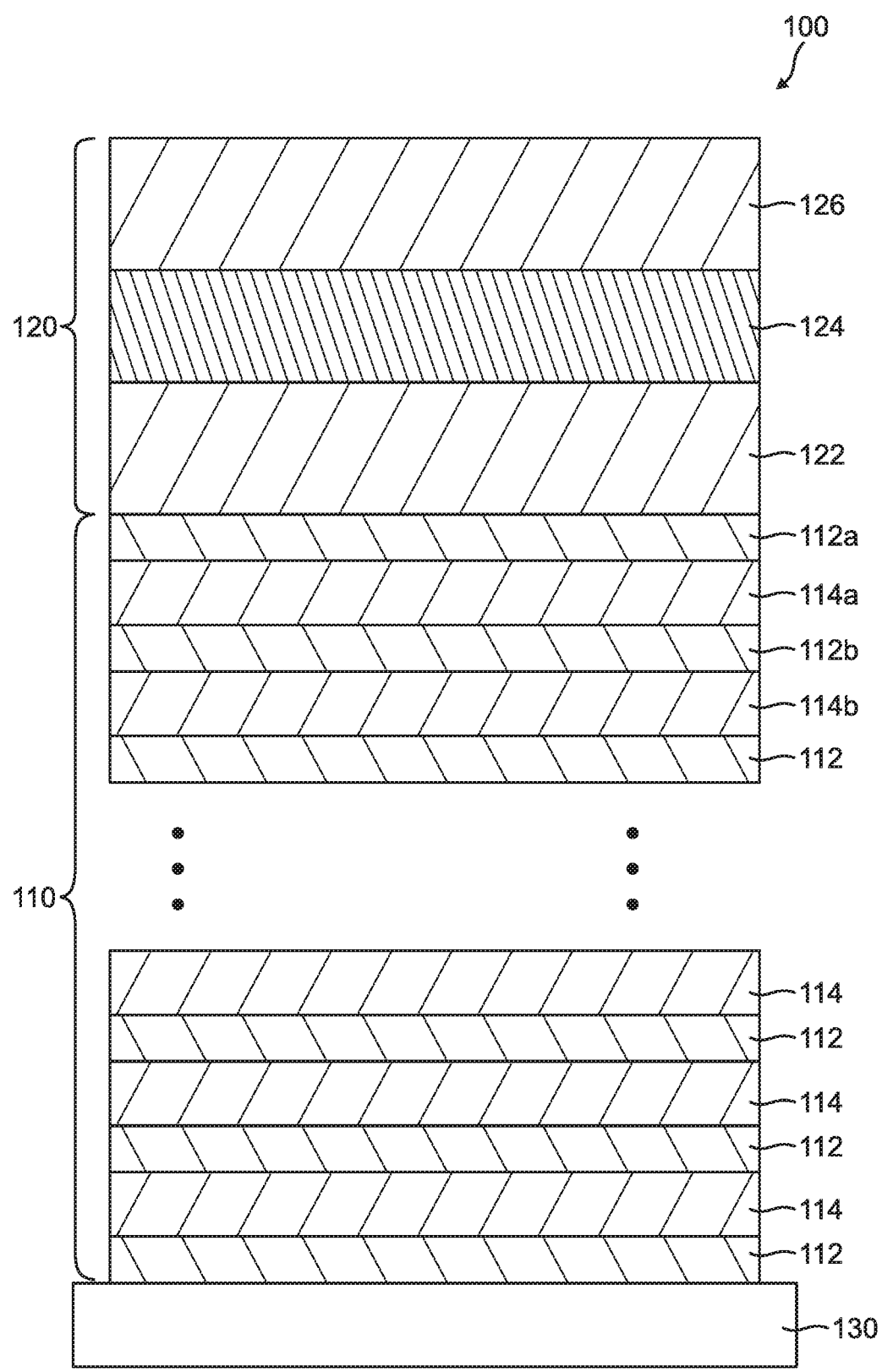
FIG. 1 is a cross-sectional schematic view of a multilayer mirror with ultraviolet (UV) protection, which can be implemented in a ring laser gyroscope, according to one embodiment.

FIG. 1 illustrates a multilayer mirror 100 with UV protection, which can be implemented in a ring laser gyroscope, according to one embodiment. The multilayer mirror 100 includes a reflector section 110 comprising a plurality of alternating (e.g., interleaved) high and low index dielectric layers, and a UV filter section 120 that includes multiple filter layers.

The alternating high and low index dielectric layers of reflector section 110 comprise a first set of high index layers 112, which are composed of a high index of refraction optical material (n1), and a second set of low index layers 114, which are composed of a low index of refraction optical material (n2). In one exemplary embodiment, high index layers 112 comprise zirconia ($ZrO_2$), and low index layers 114 comprise silica ($SiO_2$). In one example, high and low index layers 112, 114 are formed as a number of quarter-wave high/low (HL) index pairs, such as $ZrO_2/SiO_2$ quarter-wave pairs.

The quarter-wave HL index pairs create the reflection properties of multilayer mirror 100. Each quarter-wave HL index pair is typically formed in repeating 10s of layers. The physical thickness of each high-index layer is less than the thickness of each low-index layer, but both high and low index layers described as a quarter-wave layers. The reason is that "quarter-wave" or "half-wave" is referring to the optical path length (OPL), which defined as: OPL=(refractive index)*(physical thickness). For instance, a high index material will need a thinner physical layer than a low index material to make a quarter-wave layer.

The alternating high and low index dielectric layers of reflector section 110 can be formed on a substrate 130. The substrate 130 can be a low expansion glass that suitably matches the thermal coefficient of a laser block of a ring laser gyroscope, which is described further hereafter.

The multiple filter layers of UV filter section 120 include a first filter layer 122 comprising a low index of refraction optical material (n2), which is on a top high index layer 112a of reflector section 110. A second filter layer 124 is on first filter layer 122, with second filter layer 124 comprising a high index of refraction optical material (n3) that is different than the high index of refraction optical material (n1) of high index layers 212. A third filter layer 126 is on second filter layer 124, with third filter layer 126 comprising a low index of refraction optical material (n2). In one exemplary embodiment, first filter layer 122 comprises silica, second filter layer 124 comprises alumina ($Al_2O_3$), and third filter layer 126 again comprises silica. The UV filter section 120 is operative to substantially block UV energy, thereby preventing UV energy from substantially impinging on high index layers 112.

In UV filter section 120, each of first filter layer 122, second filter layer 124, and third filter layer 126, has an optical thickness that is greater than the optical thickness of each layer of reflector section 110. For example, each of the high and low index layers 112, 114 can be optical quarter-wave structures, and each of filter layers 122, 124, and 126 can be optical half-wave structures. The third filter layer 126 also provides protection from post-deposition processing.

Table 1 summarizes the layer material and corresponding optical thickness for the filter layers and high/low index layers in an example embodiment of multilayer mirror 100.

TABLE 1

| Layer Material | Optical Thickness |
| --- | --- |
| Air | N/A |
| n2 (filter layer 126) | half-wave |
| n3 (filter layer 124) | half-wave |
| n2 (filter layer 122) | half-wave |
| n1 (high index layer 112a) | quarter-wave |
| n2 (low index layer 114a) | quarter-wave |
| n1 (high index layer 112b) | quarter-wave |
| n2 (low index layer 114b) | quarter-wave |
| . | . |
| . | . |
| . | . |

As listed in Table 1, high/low index layers (n1/n2) are formed as a number of quarter-wave pairs (e.g., layers 112a/114a, 112b/114b, etc., see FIG. 1), such as $ZrO_2/SiO_2$ quarter-wave pairs. The filter layer 122 comprises a half-wave of a low index layer (n2) such as $SiO_2$, filter layer 124 comprises a half-wave of another high index layer (n3) such as $Al_2O_3$, and filter layer 126 comprises a half-wave of a low index layer (n2) such as $SiO_2$, which is exposed to air.

In various example embodiments, high index layers 112 can each have a physical thickness of about 710 angstroms to about 780 angstroms, and low index layers 114 can each have a physical thickness of about 1010 angstroms to about 1120 angstroms. Additionally, filter layer 122 can have a physical thickness of about 2020 angstroms to about 2230 angstroms; filter layer 124 can have a physical thickness of about 1950 angstroms to about 2150 angstroms; and filter layer 126 can have a physical thickness of about 2020 angstroms to about 2230 angstroms. In one example embodiment, the filter layer 124 comprises alumina and has a thickness of at least about 2000 angstroms.

The various layers of multilayer mirror 100 can be formed utilizing suitable deposition processes, such as electron beam or ion beam deposition processes, magnetron processes, and the like. For example, a deposition of $ZrO_2/SiO_2$ quarter-wave pairs is carried out until the desired number of $ZrO_2/SiO_2$ quarter-wave pairs is present in reflector section 110. This is followed by deposition of the layers of UV filter section 120, such as a half-wave of $SiO_2$, a half-wave of $Al_2O_3$, and another half-wave of $SiO_2$.

Notably, although a certain number of high and low index layers 112, 114 are shown in FIG. 1, the particular number of layers is merely for illustrative purposes, and several more alternating layers may be deposited to form reflector section 110 of multilayer mirror 100.

Figure 2:
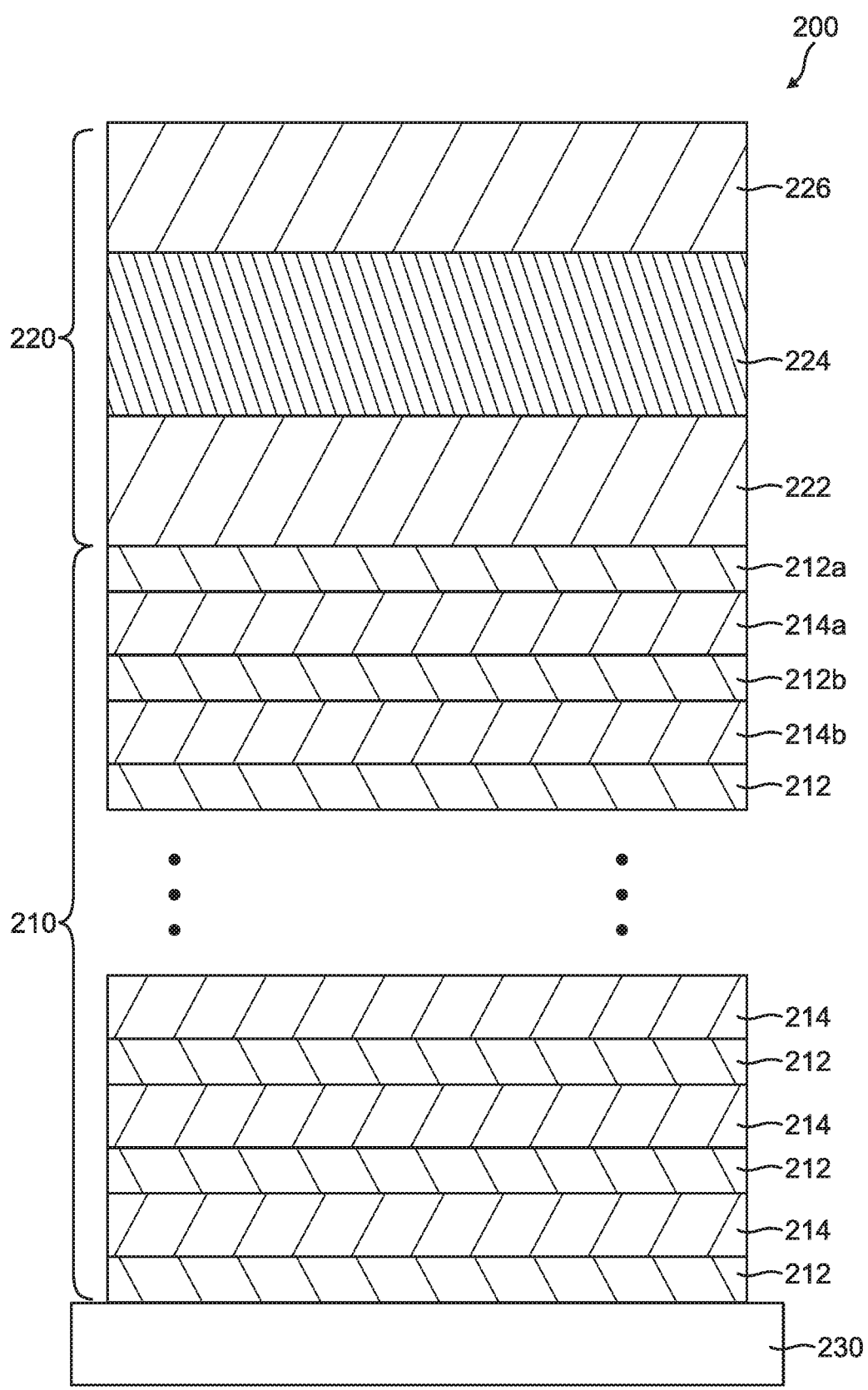
FIG. 2 is a cross-sectional schematic view of a multilayer mirror with UV protection, according to another embodiment.

FIG. 2 illustrates a multilayer mirror 200 with UV protection, which can be implemented in a ring laser gyroscope, according to another embodiment. The multilayer mirror 200 includes a reflector section 210 comprising a plurality of alternating high and low index dielectric layers, and a UV filter section 220 that includes multiple filter layers.

The alternating high and low index dielectric layers of reflector section 210 comprise a first set of high index layers 212, which are composed of a high index of refraction optical material (n1), and a second set of low index layers 214, which are composed of a low index of refraction optical material (n2). In one exemplary embodiment, high index layers 212 comprise zirconia ($ZrO_2$), and low index layers 214 comprise silica ($SiO_2$). In one example, high and low index layers 212, 214 are formed as a number of quarter-wave pairs, such as $ZrO_2/SiO_2$ quarter-wave pairs.

The alternating high and low index dielectric layers of reflector section 210 can be formed on a substrate 230. The substrate 230 can be a low expansion glass that suitably matches the thermal coefficient of a laser block of a ring laser gyroscope, for example.

The multiple filter layers of UV filter section 220 include a first filter layer 222 comprising a low index of refraction optical material (n2), which is on a top high index layer 212a of reflective section 210. A second filter layer 224 is on first filter layer 222, with second filter layer 224 comprising a high index of refraction optical material (n3) that is different than the high index of refraction optical material (n1) of high index layers 212. A third filter layer 226 is on second filter layer 224, with third filter layer 226 comprising a low index of refraction optical material (n2). In one exemplary embodiment, first filter layer 222 comprises silica, second filter layer 224 comprises alumina ($Al_2O_3$), and third filter layer 126 again comprises silica. The UV filter section 220 is operative to substantially block UV energy, thereby preventing UV energy from substantially impinging on high index layers 212.

In UV filter section 220, each of first filter layer 222, second filter layer 224, and third filter layer 226, has an optical thickness that is greater than the optical thickness of each layer of reflector section 210. For example, high and low index layers 212, 214 can each be optical quarter-wave structures, while first filter layer 222 can be an optical half-wave structure, second filter layer 224 can be an optical full-wave (or two half-waves) structure, and third filter layer 226 can be an optical half-wave structure. The third filter layer 226 also provides protection from post-deposition processing. It should be noted that any integer number of half-wave layers can be used to form the filter layers.

Table 2 summarizes the layer material and corresponding optical thickness for the filter layers and high/low index layers in an example embodiment of multilayer mirror 200.

TABLE 2

| Layer Material | Optical Thickness |
| --- | --- |
| Air | N/A |
| n2 (filter layer 226) | half-wave |
| n3 (filter layer 224) | full-wave (2 half-waves) |
| n2 (filter layer 222) | half-wave |
| n1 (high index layer 212a) | quarter-wave |
| n2 (low index layer 214a) | quarter-wave |
| n1 (high index layer 212b) | quarter-wave |
| n2 (low index layer 214b) | quarter-wave |
| . | . |
| . | . |
| . | . |

As listed in Table 2, the high/low index layers (n1/n2) are formed as a number of quarter-wave pairs (e.g., layers 212a/214a, 212b/214b, etc.), such as $ZrO_2/SiO_2$ quarter-wave pairs. The filter layer 222 comprises a half-wave of a low index layer (n2) such as $SiO_2$, filter layer 224 comprises a full-wave (or 2 half-waves) of another high index layer (n3) such as $Al_2O_3$, and filter layer 226 comprises a half-wave of a low index layer (n2) such as $SiO_2$, which is exposed to air.

In various embodiments, high index layers 212 can each have a physical thickness of about 710 angstroms to about 780 angstroms, and low index layers 214 can each have a physical thickness of about 1010 angstroms to about 1120 angstroms. Additionally, filter layer 222 can have a physical thickness of about 2020 angstroms to about 2230 angstroms; filter layer 224 can have a physical thickness of about 3890 angstroms to about 4300 angstroms; and filter layer 226 can have a physical thickness of about 2020 angstroms to about 2230 angstroms.

The various layers of multilayer mirror 200 can be formed utilizing suitable deposition processes, such as electron beam or ion beam deposition processes, magnetron processes, and the like. For example, a deposition of $ZrO_2/SiO_2$ quarter-wave pairs is carried out until the desired number of $ZrO_2/SiO_2$ quarter-wave pairs is present in reflector section 210. This is followed by deposition of the layers of UV filter section 220, such as a half-wave of $SiO_2$, a full-wave of $Al_2O_3$, and another half-wave of $SiO_2$.

Figure 3:
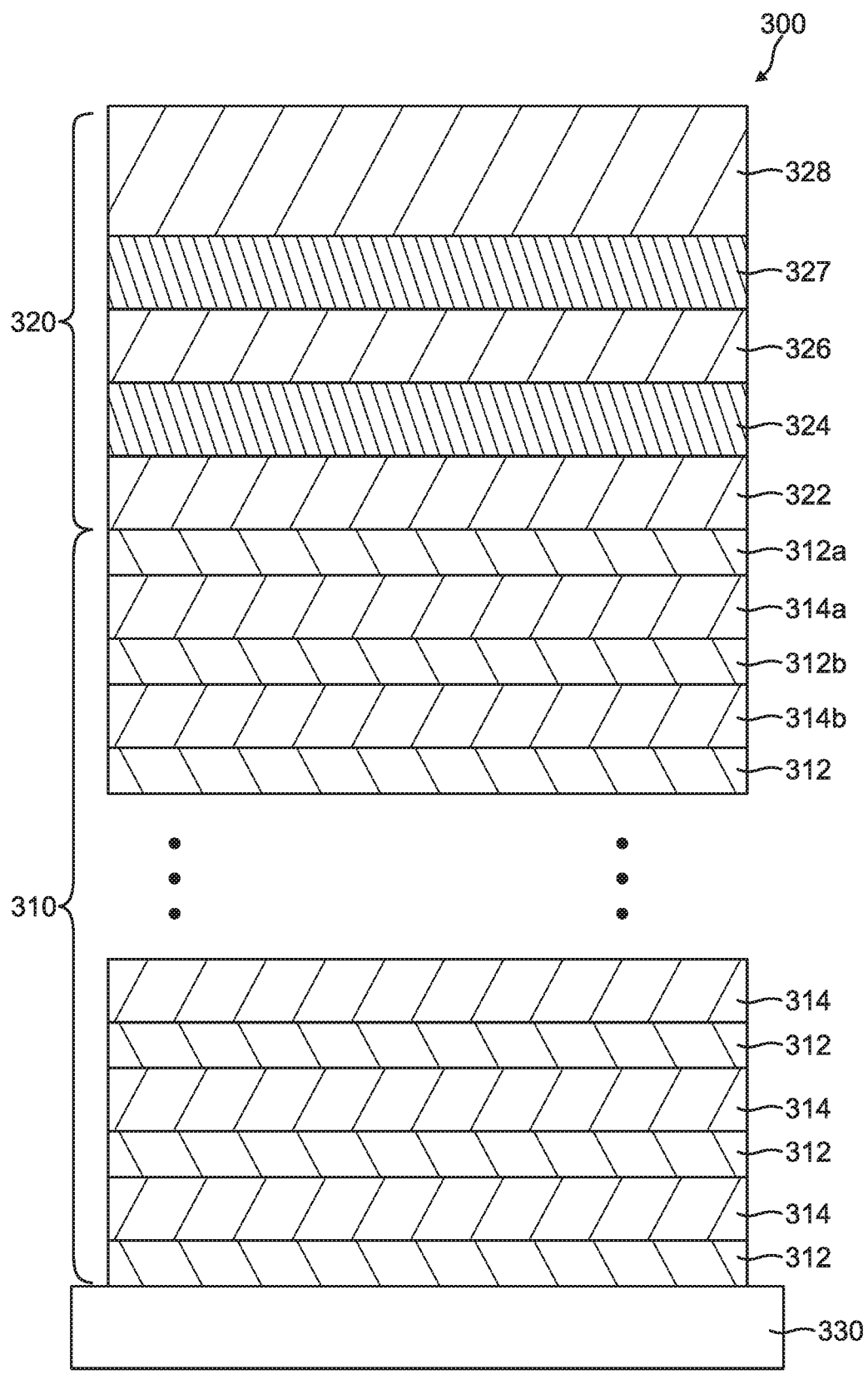
FIG. 3 is a cross-sectional schematic view of a multilayer mirror with UV protection, according to an alternative embodiment.

FIG. 3 illustrates a multilayer mirror 300 with UV protection, which can be implemented in a ring laser gyroscope, according to an alternative embodiment. The multilayer mirror 300 includes a reflector section 310 comprising a plurality of alternating high and low index dielectric layers, and a UV filter section 320 that includes multiple filter layers. In this embodiment, the UV filter section 320 includes UV filter material that is also incorporated into the reflector design of multilayer mirror 300, as described further hereafter.

The alternating high and low index dielectric layers of reflector section 310 comprise a first set of high index layers 312, which are composed of a high index of refraction optical material (n1), and a second set of low index layers 314, which are composed of a low index of refraction optical material (n2). In one exemplary embodiment, high index layers 312 comprise zirconia ($ZrO_2$), and low index layers 314 comprise silica ($SiO_2$). In one example, high and low index layers 312, 314 are formed as a number of quarter-wave pairs, such as $ZrO_2/SiO_2$ quarter-wave pairs.

The alternating high and low index dielectric layers of reflector section 310 can be formed on a substrate 330. The substrate 330 can be a low expansion glass that suitably matches the thermal coefficient of a laser block of a ring laser gyroscope.

The multiple filter layers of UV filter section 320 include a first filter layer 322 comprising a low index of refraction optical material (n2), which is on a top high index layer 312a of reflective section 310. A second filter layer 324 is on first filter layer 322, with second filter layer 324 comprising a high index of refraction optical material (n3) that is different than the high index of refraction optical material (n1) of high index layers 312. A third filter layer 326 is on second filter layer 324, with third filter layer 326 comprising a low index of refraction optical material (n2). A fourth filter layer 327 is on third filter layer 326, with fourth filter layer 327 comprising a high index of refraction optical material (n3). A fifth filter layer 328 is on fourth filter layer 327, with fifth filter layer 328 comprising a low index of refraction optical material (n2). In one exemplary embodiment, first filter layer 322 comprises silica, second filter layer 324 comprises alumina, third filter layer 326 comprises silica, fourth filter layer 327 comprises alumina, and fifth filter layer 328 comprises silica.

The UV filter section 320 is designed to incorporate the UV filtering material (e.g., n3 (alumina)) as a part of the reflecting component of multilayer mirror 300. The quarter-wave high/low (HL) index pairs create the mirror reflection. Thus, the high index (n3) material can be used as a high index layer paired with a low index (n2) layer in quarter-wave pairs. It should be noted that the n3 material is less effective as a high index material than the n1 material when $n1 > n3 > n2$.

In this embodiment, two pairs of quarter-wave n3/n2 HL layers are used to get an equivalent half-wave layer of n3 to get the same UV blocking (based on penetration depth) of a half-wave of n3 (as in previous embodiments), but also to get some additional reflectance using n3 in the HL pair. The top layer of UV filter section 320 is a half-wave of low index material, which also provides protection from post-deposition processing.

Table 3 summarizes the layer material and corresponding optical thickness for the various layers in an example embodiment of multilayer mirror 300.

TABLE 3

| Layer Material | Optical Thickness |
| --- | --- |
| Air | N/A |
| n2 (filter layer 328) | half-wave |
| n3 (filter layer 327) | quarter-wave |
| n2 (filter layer 326) | quarter-wave |
| n3 (filter layer 324) | quarter-wave |
| n2 (filter layer 322) | quarter-wave |
| n1 (high index layer 312a) | quarter-wave |
| n2 (low index layer 314a) | quarter-wave |
| n1 (high index layer 312b) | quarter-wave |
| n2 (low index layer 314b) | quarter-wave |
| . | . |
| . | . |
| . | . |

As listed in Table 3, high/low index layers (n1/n2) are formed as a number of quarter-wave pairs (312a/314a, 312b/314b, etc.), such as $ZrO_2/SiO_2$ quarter-wave pairs. The filter layer 322 comprises a quarter-wave of a low index layer (n2) such as $SiO_2$, filter layer 324 comprises a quarter-wave of another high index layer (n3) such as $Al_2O_3$, filter layer 326 comprises a quarter-wave of a low index layer (n2) such as $SiO_2$, filter layer 327 comprises a quarter-wave of a high index layer (n3) such as $Al_2O_3$, and filter layer 328 comprises a half-wave of a low index layer (n2) such as $SiO_2$, which is exposed to air.

In one example embodiment, high index layers 312 can each have a physical thickness of about 710 angstroms to about 780 angstroms, and low index layers 314 can each have a physical thickness of about 1010 angstroms to about 1120 angstroms. Additionally, filter layers 322 and 326 can have a physical thickness of about 1010 angstroms to about 1120 angstroms; filter layers 324 and 327 can have a physical thickness of about 970 angstroms to about 1080 angstroms; and filter layer 328 can have a physical thickness of about 2020 angstroms to about 2230 angstroms.

The various layers of multilayer mirror 300 can be formed utilizing suitable deposition processes, such as described previously. For example, a deposition of $ZrO_2/SiO_2$ quarter-wave pairs is carried out until the desired number of $ZrO_2/SiO_2$ quarter-wave pairs is present in reflector section 310. This is followed by deposition of the layers of UV filter section 320, such as a quarter-wave of $SiO_2$, a quarter-wave of $Al_2O_3$, a quarter-wave of $SiO_2$, a quarter-wave of $Al_2O_3$, and a half-wave of $SiO_2$.

Figure 4:
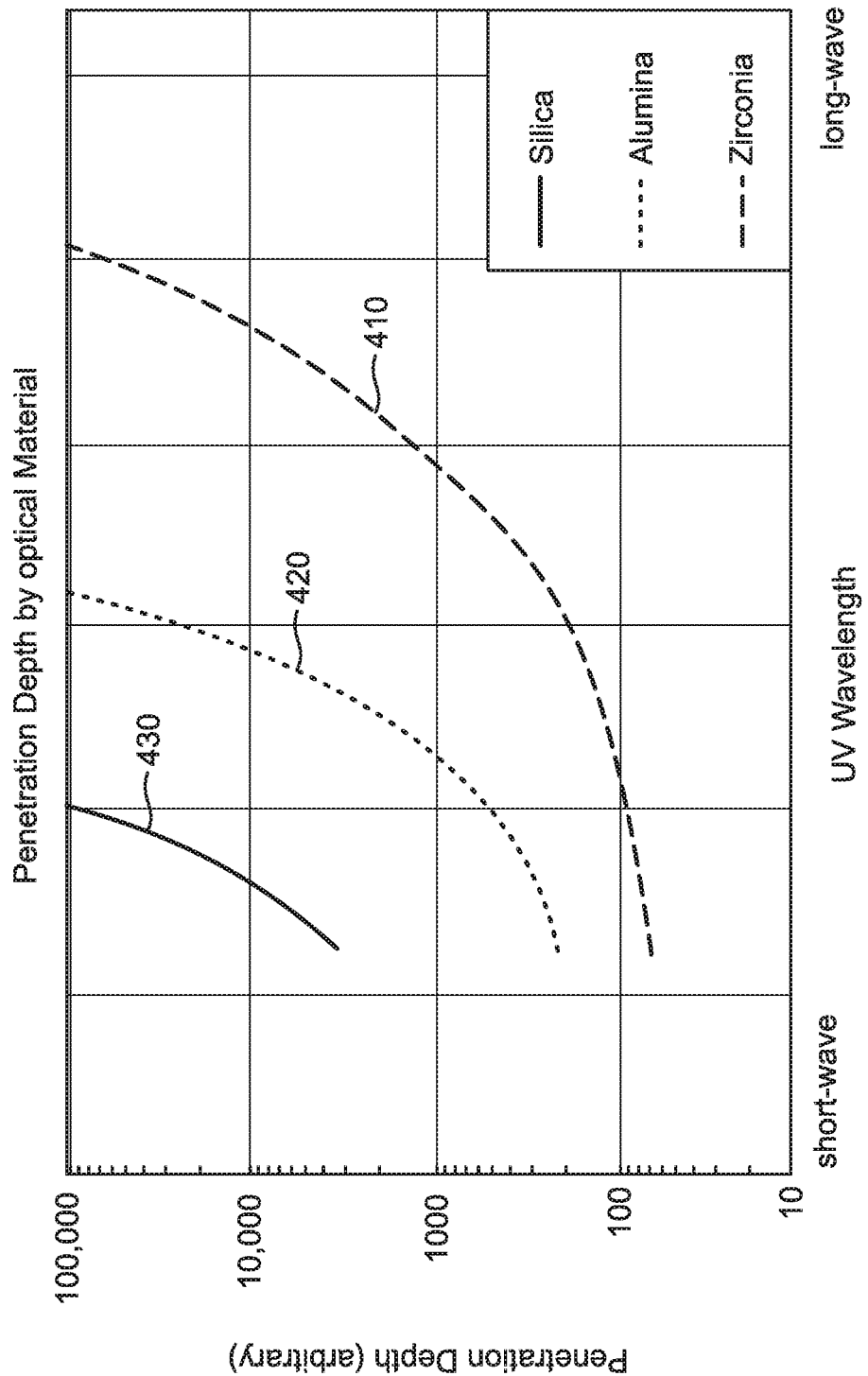
FIG. 4 is a graphical representation of penetration depth with respect to UV wavelength for optical materials suitable for use in a multilayer mirror.

FIG. 4 is a plot of penetration depth with respect to UV wavelength for optical materials suitable for use in a multilayer mirror. The penetration depth (in arbitrary units) is shown versus impinging UV wavelength for each of three optical materials, including silica, alumina, and zirconia. The penetration depth ($\delta$) is equal to the distance at which intensity (irradiance) attenuates by 1/e for a given incident wavelength of light. In FIG. 4, the curves 410 (zirconia), 420 (alumina), and 430 (silica) show that for a given UV wavelength, the amount or thickness of the UV filter material can vary.

Figure 5:
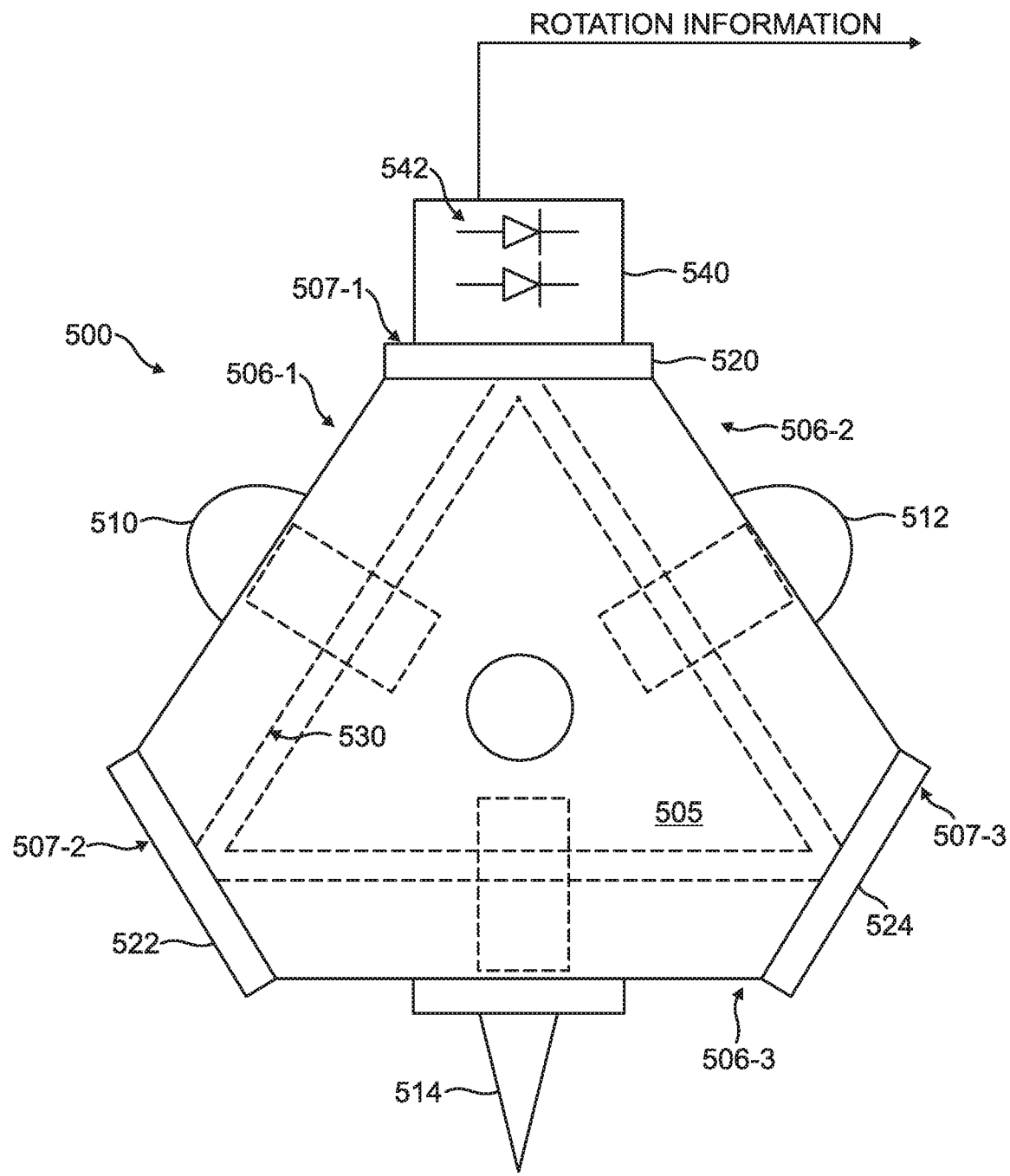
FIG. 5 is schematic diagram of a ring laser gyroscope, according to an example embodiment, which can be implemented with the multilayer mirrors of any of FIGS. 1-3.

FIG. 5 illustrates a ring laser gyroscope 500 according to an example embodiment, which can be implemented with the multilayer mirrors described previously. The ring laser gyroscope 500 includes a laser block assembly 505, which in this embodiment, is triangular-shaped with three sides 506-1, 506-2, and 506-3. The laser block assembly 505 has three corners 507-1, 507-2, and 507-3. A first cathode 510 is on side 506-1, a second cathode 512 is on side 506-2, and an anode 514 is on side 506-3.

The ring laser gyroscope 500 further includes a set of multilayer mirrors 520, 522, and 524, which are positioned at the respective corners 507-1, 507-2 and 507-3. The multilayer mirrors 520, 522, and 524 can be implemented in accordance with any of the multilayer mirror embodiments illustrated in FIGS. 1-3.

A triangular cavity 530 is located within laser block assembly 505 and is parallel to sides 506-1, 506-2 and 506-3. The cavity 530 is configured in conjunction with multilayer mirrors 520, 522, 524 to form a ring shaped laser beam path around laser block assembly 505. The cavity 530 is filled with a suitable gas mixture, such as helium and neon, which are used to generate a laser beam in cavity 530. The ring laser gyroscope 500 can include a readout assembly 540 with a pair of photodiodes 542, which in operation, couples optical energy out from cavity 530 and converts the optical energy to voltage signals from which rotation information can be obtained.

The multilayer mirrors 520, 522, and 524 implemented in accordance the multilayer mirrors described previously, provide suitable UV protection for high index layers in the mirrors. For example, the alumina layer(s) in the mirrors protect the underlying zirconia layers from UV radiation, preventing the zirconia layers from showing high loss or loss growth by absorbing the laser light in ring laser gyroscope 500.

EXAMPLE EMBODIMENTS

Example 1 includes a multilayer mirror, comprising: a reflector section comprising a plurality of alternating layers of a high refractive index optical material and a low refractive index optical material, wherein each layer of the plurality of alternating layers has an optical thickness; and a filter section over the reflector section, the filter section comprising: a first filter layer comprising a low refractive index optical material on a layer of high refractive index optical material of the reflector section; a second filter layer on the first filter layer, the second filter layer comprising a high refractive index optical material that is different than the high refractive index optical material in the reflector section; and a third filter layer on the second filter layer, the third filter layer comprising a low refractive index optical material; wherein each of the first filter layer, the second filter layer, and the third filter layer has an optical thickness that is greater than or equal to the optical thickness of each layer of the plurality of alternating layers; wherein the filter section substantially blocks ultraviolet (UV) energy, thereby preventing UV energy from substantially impinging on the high refractive index optical material of the reflector section.

Example 2 includes the multilayer mirror of Example 1, wherein the optical thickness of each layer of the plurality of alternating layers is a quarter-wave.

Example 3 includes the multilayer mirror of any of Examples 1-2, wherein the optical thickness of each of the first filter layer, the second filter layer, and the third filter layer is a half-wave.

Example 4 includes the multilayer mirror of any of Examples 1-2, wherein the optical thickness of the first filter layer is a half-wave, the optical thickness of the second filter layer is a full-wave, and the optical thickness of the third filter layer is a half-wave.

Example 5 includes the multilayer mirror of any of Examples 1-2, further comprising: a fourth filter layer on the third filter layer, the fourth filter layer comprising a high refractive index optical material that is different than the high refractive index optical material in the reflector section; and a fifth filter layer on the fourth filter layer, the fifth filter layer comprising a low refractive index optical material.

Example 6 includes the multilayer mirror of Example 5, wherein the optical thickness of the first filter layer is a quarter-wave, the optical thickness of the second filter layer is a quarter-wave, the optical thickness of the third filter layer is a quarter-wave, the optical thickness of the fourth filter layer is a quarter-wave, and the optical thickness of the fifth filter layer is a half-wave.

Example 7 includes the multilayer mirror of any of Examples 1-6, wherein the high refractive index optical material in the reflector section comprises zirconia.

Example 8 includes the multilayer mirror of any of Examples 1-7, wherein the low refractive index optical material in the reflector section comprises silica.

Example 9 includes the multilayer mirror of any of Examples 1-8, wherein the high refractive index optical material in the filter section comprises alumina.

Example 10 includes the multilayer mirror of any of Examples 1-9, wherein the low refractive index optical material in the filter section comprises silica.

Example 11 includes the multilayer mirror of any of Examples 1-10, further comprising a substrate layer under the plurality of alternating layers.

Example 12 includes the multilayer mirror of any of Examples 1-11, wherein the multilayer mirror is implemented in a laser cavity of a ring laser gyroscope.

Example 13 includes a ring laser gyroscope, comprising: a laser block assembly; a cavity in the laser block assembly; and a plurality of multilayer mirrors in the cavity, wherein at least one multilayer mirror of the plurality of multilayer mirrors comprises: a reflector section comprising a plurality of alternating layers of a high refractive index optical material and a low refractive index optical material, wherein each layer of the plurality of alternating layers has an optical thickness; and a filter section over the reflector section, the filter section comprising: a first filter layer comprising a low refractive index optical material on a layer of high refractive index optical material of the reflector section; a second filter layer on the first filter layer, the second filter layer comprising a high refractive index optical material that is different than the high refractive index optical material in the reflector section; and a third filter layer on the second filter layer, the third filter layer comprising a low refractive index optical material; wherein each of the first filter layer, the second filter layer, and the third filter layer has an optical thickness that is greater than or equal to the optical thickness of each layer of the plurality of alternating layers; wherein the filter section substantially blocks ultraviolet (UV) energy, thereby preventing UV energy from substantially impinging on the high refractive index optical material of the reflector section.

Example 14 includes the ring laser gyroscope of Example 13, wherein the optical thickness of each layer of the plurality of alternating layers is a quarter-wave.

Example 15 includes the ring laser gyroscope of any of Examples 13-14, wherein the optical thickness of each of the first filter layer, the second filter layer, and the third filter layer is a half-wave.

Example 16 includes the ring laser gyroscope of any of Examples 13-14, wherein the optical thickness of the first filter layer is a half-wave, the optical thickness of the second filter layer is a full-wave, and the optical thickness of the third filter layer is a half-wave.

Example 17 includes the ring laser gyroscope of any of Examples 13-14, further comprising: a fourth filter layer on the third filter layer, the fourth filter layer comprising a high refractive index optical material that is different than the high refractive index optical material in the reflector section; and a fifth filter layer on the fourth filter layer, the fifth filter layer comprising a low refractive index optical material.

Example 18 includes the ring laser gyroscope of Example 17, wherein the optical thickness of the first filter layer is a quarter-wave, the optical thickness of the second filter layer is a quarter-wave, the optical thickness of the third filter layer is a quarter-wave, the optical thickness of the fourth filter layer is a quarter-wave, and the optical thickness of the fifth filter layer is a half-wave.

Example 19 includes the ring laser gyroscope of any of Examples 13-18, wherein: the high refractive index optical material in the reflector section comprises zirconia; the low refractive index optical material in the reflector section comprises silica; the high refractive index optical material in the filter section comprises alumina; and the low refractive index optical material in the filter section comprises silica.

Example 20 includes the ring laser gyroscope of any of Examples 13-19, wherein the plurality of multilayer mirrors comprises three or more multilayer mirrors.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A multilayer mirror, comprising:
   a reflector section comprising a plurality of alternating layers of a high refractive index optical material and a low refractive index optical material, wherein each layer of the plurality of alternating layers has an optical thickness; and
   a filter section over the reflector section, the filter section comprising:
      a first filter layer comprising a low refractive index optical material on a layer of high refractive index optical material of the reflector section;
      a second filter layer on the first filter layer, the second filter layer comprising a high refractive index optical material that is different than the high refractive index optical material in the reflector section; and
      a third filter layer on the second filter layer, the third filter layer comprising a low refractive index optical material;
      wherein each of the first filter layer, the second filter layer, and the third filter layer has an optical thickness that is greater than or equal to the optical thickness of each layer of the plurality of alternating layers;
   wherein the optical thickness of the first filter layer is a half-wave, the optical thickness of the second filter layer is a full-wave, and the optical thickness of the third filter layer is a half-wave;
   wherein the filter section substantially blocks ultraviolet (UV) energy, thereby preventing UV energy from substantially impinging on the high refractive index optical material of the reflector section.

2. The multilayer mirror of claim 1, wherein the optical thickness of each layer of the plurality of alternating layers is a quarter-wave.

3. The multilayer mirror of claim 1, further comprising:
   a fourth filter layer on the third filter layer, the fourth filter layer comprising a high refractive index optical material that is different than the high refractive index optical material in the reflector section; and
   a fifth filter layer on the fourth filter layer, the fifth filter layer comprising a low refractive index optical material.

4. The multilayer mirror of claim 3, wherein the the optical thickness of the fourth filter layer is a quarter-wave, and the optical thickness of the fifth filter layer is a half-wave.

5. The multilayer mirror of claim 1, wherein the high refractive index optical material in the reflector section comprises zirconia.

6. The multilayer mirror of claim 1, wherein the low refractive index optical material in the reflector section comprises silica.

7. The multilayer mirror of claim 1, wherein the high refractive index optical material in the filter section comprises alumina.

8. The multilayer mirror of claim 1, wherein the low refractive index optical material in the filter section comprises silica.

9. The multilayer mirror of claim 1, further comprising a substrate layer under the plurality of alternating layers.

10. The multilayer mirror of claim 1, wherein the multilayer mirror is implemented in a laser cavity of a ring laser gyroscope.

11. A ring laser gyroscope, comprising:
a laser block assembly;
a cavity in the laser block assembly; and
a plurality of multilayer mirrors in the cavity, wherein at least one multilayer mirror of the plurality of multilayer mirrors comprises:
  a reflector section comprising a plurality of alternating layers of a high refractive index optical material and a low refractive index optical material, wherein each layer of the plurality of alternating layers has an optical thickness; and
  a filter section over the reflector section, the filter section comprising:
    a first filter layer comprising a low refractive index optical material on a layer of high refractive index optical material of the reflector section;
    a second filter layer on the first filter layer, the second filter layer comprising a high refractive index optical material that is different than the high refractive index optical material in the reflector section; and
    a third filter layer on the second filter layer, the third filter layer comprising a low refractive index optical material;
    wherein each of the first filter layer, the second filter layer, and the third filter layer has an optical thickness that is greater than or equal to the optical thickness of each layer of the plurality of alternating layers;
wherein the optical thickness of the first filter layer is a half-wave, the optical thickness of the second filter layer is a full-wave, and the optical thickness of the third filter layer is a half-wave;
  wherein the filter section substantially blocks ultraviolet (UV) energy, thereby preventing UV energy from substantially impinging on the high refractive index optical material of the reflector section.

12. The ring laser gyroscope of claim 11, wherein the optical thickness of each layer of the plurality of alternating layers is a quarter-wave.

13. The ring laser gyroscope of claim 11, further comprising:
  a fourth filter layer on the third filter layer, the fourth filter layer comprising a high refractive index optical material that is different than the high refractive index optical material in the reflector section; and
  a fifth filter layer on the fourth filter layer, the fifth filter layer comprising a low refractive index optical material.

14. The ring laser gyroscope of claim 13, wherein the the optical thickness of the fourth filter layer is a quarter-wave, and the optical thickness of the fifth filter layer is a half-wave.

15. The ring laser gyroscope of claim 11, wherein:
  the high refractive index optical material in the reflector section comprises zirconia;
  the low refractive index optical material in the reflector section comprises silica;
  the high refractive index optical material in the filter section comprises alumina; and
  the low refractive index optical material in the filter section comprises silica.

16. The ring laser gyroscope of claim 11, wherein the plurality of multilayer mirrors comprises three or more multilayer mirrors.

* * * * *